US007849152B2

(12) United States Patent
Anipindi et al.

(10) Patent No.: US 7,849,152 B2
(45) Date of Patent: Dec. 7, 2010

(54) METHOD AND SYSTEM FOR CONTROLLING AND MONITORING A WEB-CAST

(75) Inventors: Sastry Anipindi, Irving, TX (US); Ajay Chintala, Irving, TX (US); Scott Susens, Dallas, TX (US)

(73) Assignee: Yahoo! Inc., Sunnyvale, CA (US)

( * ) Notice: Subject to any disclaimer, the term of this patent is extended or adjusted under 35 U.S.C. 154(b) by 17 days.

(21) Appl. No.: 10/458,569

(22) Filed: Jun. 9, 2003

(65) Prior Publication Data

US 2004/0055016 A1    Mar. 18, 2004

Related U.S. Application Data

(60) Provisional application No. 60/387,164, filed on Jun. 7, 2002.

(51) Int. Cl.
*G06F 15/16* (2006.01)
(52) U.S. Cl. .................. 709/217; 709/228; 709/231
(58) Field of Classification Search .................. 709/200, 709/201, 204, 228, 231, 232, 243, 244, 217, 709/223, 224, 229
See application file for complete search history.

(56) References Cited

U.S. PATENT DOCUMENTS 5,844,979 A * 12/1998 Raniere et al. ......... 379/202.01

(Continued)

*Primary Examiner*—Kristie D Shingles
(74) *Attorney, Agent, or Firm*—James J. DeCarlo; Greenberg Traurig, LLP

(57) ABSTRACT

A method and system of providing control by a client of a Web-cast from a telephone, the method comprising: receiving from the client Web-cast configuration data at a web server, updating Web-cast parameters in accordance with the Web-cast configuration data and storing the Web-cast parameters in a database; receiving initiation instructions at the telephony server for the Web-cast from the client via the telephone and initiating the Web-cast in accordance with the Web-cast parameters stored in the database; receiving content data at the telephony server from the telephone, formatting the content data at the telephony server, storing the content data at a file storage server and providing content pull instructions to an encoder server; receiving the content pull instructions at the encoder server, pulling the content from the file storage server based upon the content pull instructions and encoding the content into streaming content at the encoder server; and receiving the streaming content at a media server and streaming content to an end user computer.

38 Claims, 10 Drawing Sheets

U.S. PATENT DOCUMENTS

| | | | | |
|---|---|---|---|---|
| 5,990,955 A * | 11/1999 | Koz | ............ | 375/240.01 |
| 6,012,086 A * | 1/2000 | Lowell | ............ | 709/218 |
| 6,285,405 B1 * | 9/2001 | Binford et al. | ............ | 348/512 |
| 6,297,845 B1 * | 10/2001 | Kuhn et al. | ............ | 348/192 |
| 6,324,214 B2 * | 11/2001 | Mihara | ............ | 375/240.02 |
| 6,393,196 B1 * | 5/2002 | Yamane et al. | ............ | 386/52 |
| 6,434,621 B1 * | 8/2002 | Pezzillo et al. | ............ | 709/231 |
| 6,442,598 B1 * | 8/2002 | Wright et al. | ............ | 709/217 |
| 6,446,082 B1 * | 9/2002 | Arita | ............ | 707/104.1 |
| 6,486,892 B1 * | 11/2002 | Stern | ............ | 715/760 |
| 6,564,380 B1 * | 5/2003 | Murphy | ............ | 725/86 |
| 6,625,671 B1 * | 9/2003 | Collette et al. | ............ | 710/52 |
| 6,671,881 B1 * | 12/2003 | Tamer et al. | ............ | 725/31 |
| 6,757,654 B1 * | 6/2004 | Westerlund et al. | ............ | 704/262 |
| 6,760,478 B1 * | 7/2004 | Adiletta et al. | ............ | 382/236 |
| 6,760,916 B2 * | 7/2004 | Holtz et al. | ............ | 725/34 |
| 6,763,377 B1 * | 7/2004 | Belknap et al. | ............ | 709/223 |
| 6,829,334 B1 * | 12/2004 | Zirngibl et al. | ............ | 379/88.17 |
| 6,885,734 B1 * | 4/2005 | Eberle et al. | ............ | 379/88.01 |
| 6,891,573 B2 * | 5/2005 | Schreiber et al. | ............ | 348/518 |
| 6,931,074 B1 * | 8/2005 | Palermo et al. | ............ | 375/259 |
| 6,963,910 B1 * | 11/2005 | Belknap et al. | ............ | 709/223 |
| 6,968,568 B1 * | 11/2005 | Hilpert et al. | ............ | 725/90 |
| 7,017,172 B2 * | 3/2006 | Schaffer et al. | ............ | 725/46 |
| 7,024,677 B1 * | 4/2006 | Snyder et al. | ............ | 725/86 |
| 7,082,422 B1 * | 7/2006 | Zirngibl et al. | ............ | 706/45 |
| 7,092,821 B2 * | 8/2006 | Mizrahi et al. | ............ | 702/1 |
| 2002/0016756 A1 * | 2/2002 | Rinaldi | ............ | 705/36 |
| 2002/0044633 A1 * | 4/2002 | Nabha et al. | ............ | 379/90.01 |
| 2002/0083462 A1 * | 6/2002 | Arnott | ............ | 725/100 |
| 2002/0103919 A1 * | 8/2002 | Hannaway | ............ | 709/231 |
| 2002/0120659 A1 * | 8/2002 | Parry | ............ | 709/100 |
| 2002/0159464 A1 * | 10/2002 | Lewis | ............ | 370/401 |
| 2003/0001880 A1 * | 1/2003 | Holtz et al. | ............ | 345/716 |
| 2003/0005466 A1 * | 1/2003 | Liao | ............ | 725/141 |
| 2003/0035386 A1 * | 2/2003 | Sullivan | ............ | 370/316 |
| 2003/0187657 A1 * | 10/2003 | Erhart et al. | ............ | 704/270.1 |
| 2004/0032424 A1 * | 2/2004 | Florschuetz | ............ | 345/748 |
| 2004/0038692 A1 * | 2/2004 | Muzaffar | ............ | 455/502 |
| 2004/0063400 A1 * | 4/2004 | Kim et al. | ............ | 455/3.06 |
| 2004/0193683 A1 * | 9/2004 | Blumofe | ............ | 709/204 |
| 2005/0144165 A1 * | 6/2005 | Hafizullah et al. | ............ | 707/6 |

* cited by examiner

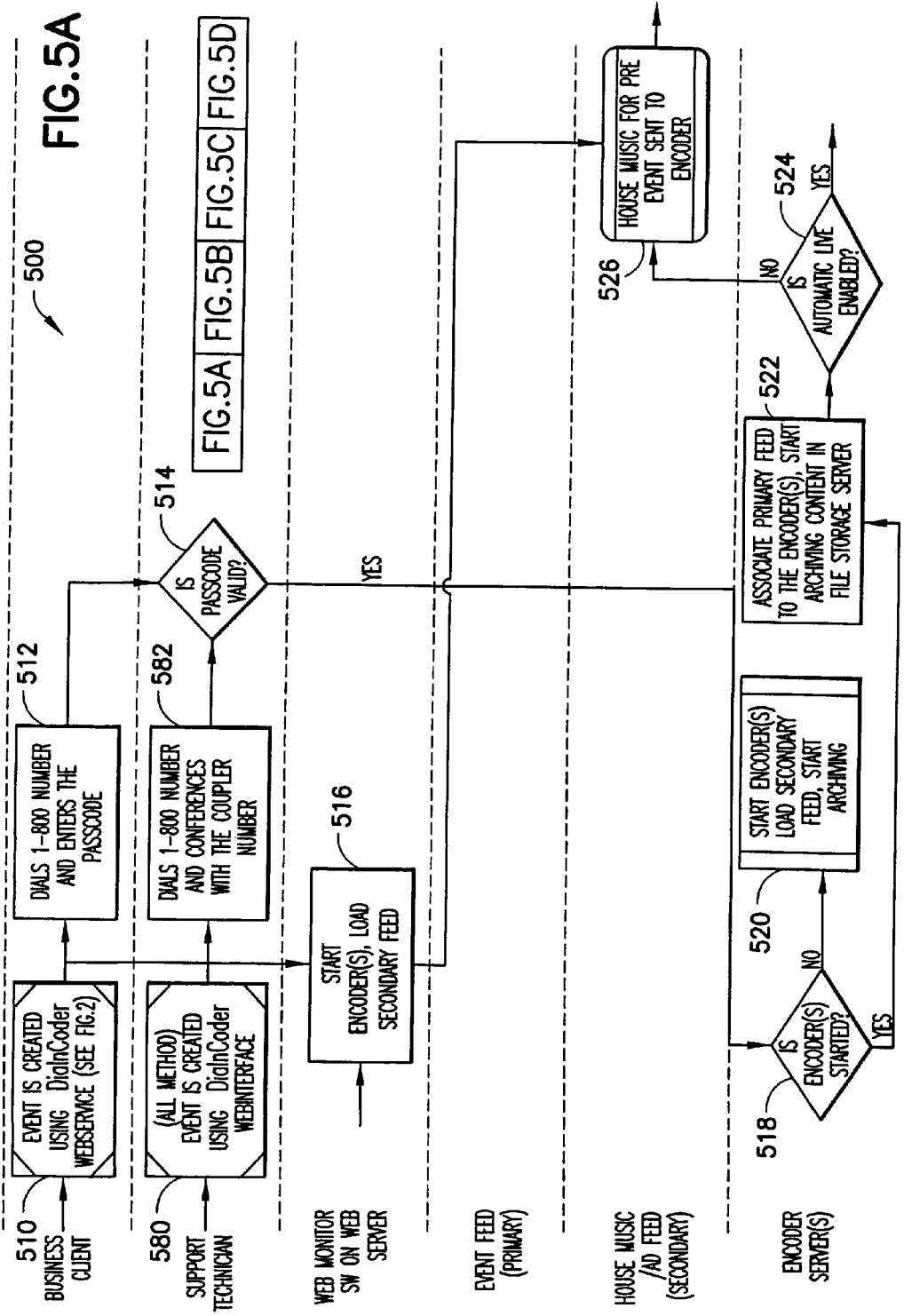

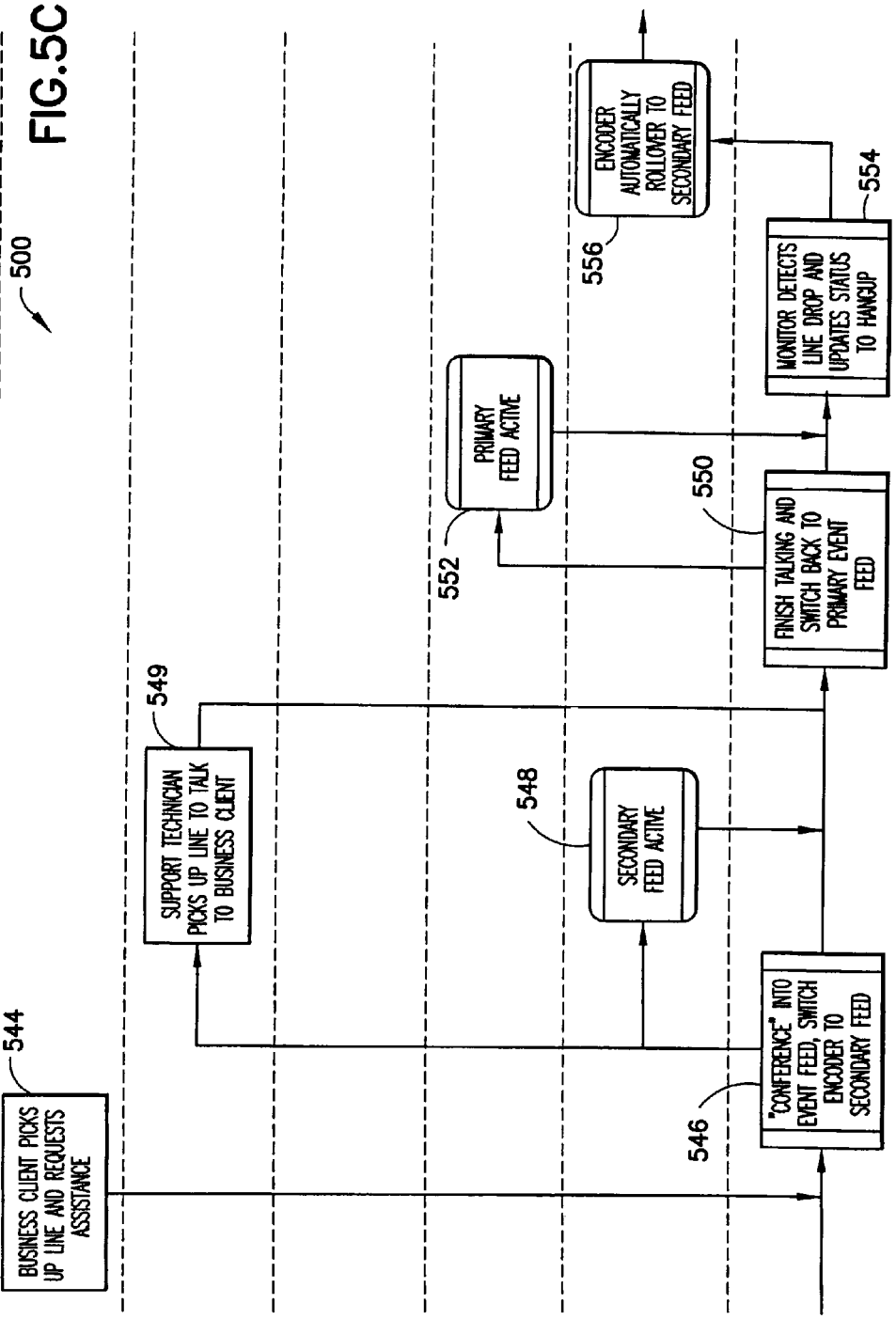

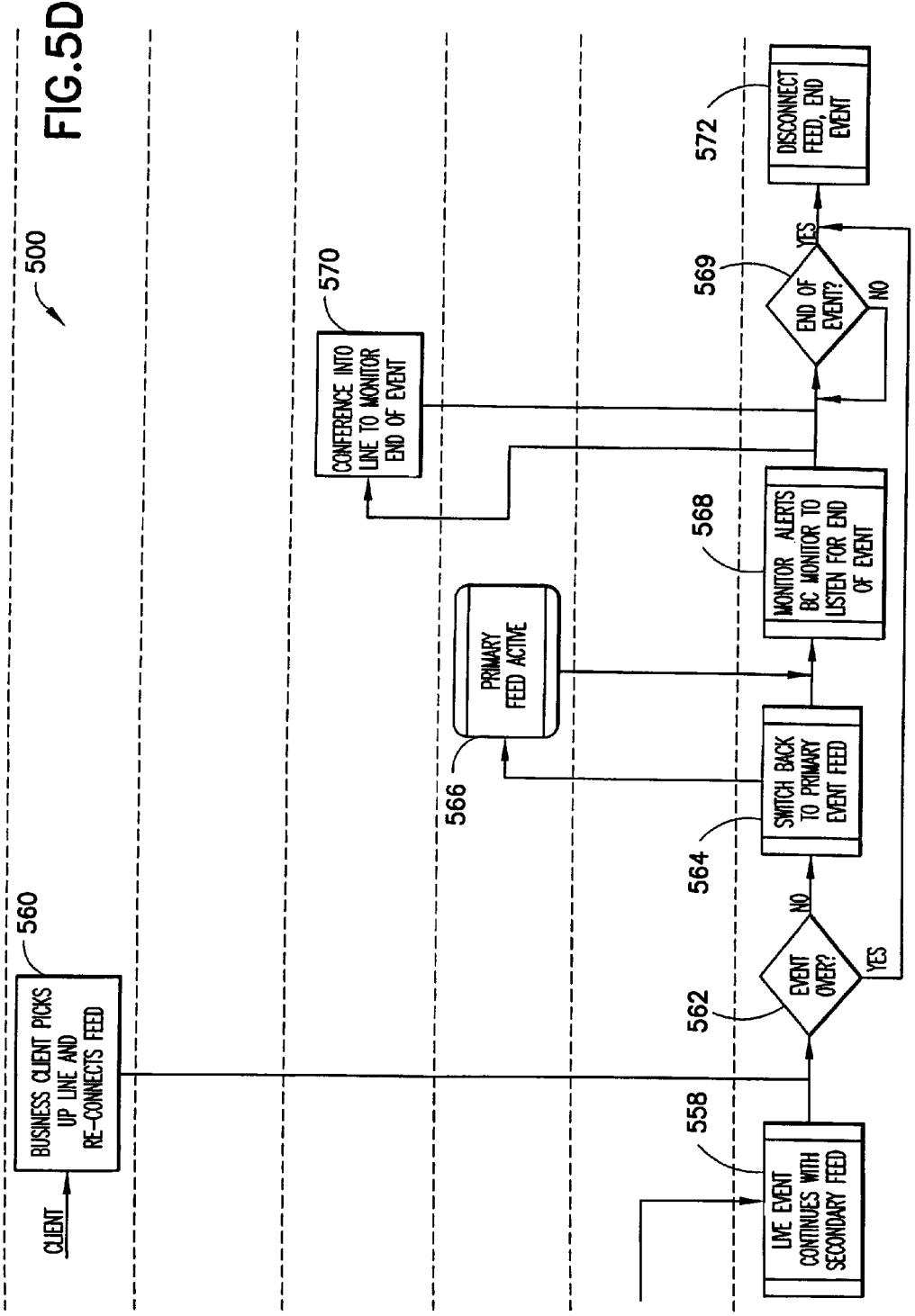

METHOD AND SYSTEM FOR CONTROLLING AND MONITORING A WEB-CAST

CROSS-REFERENCE TO RELATED APPLICATIONS

This application claims the benefit of U.S. Provisional Application Ser. No. 60/387,164, entitled Method and System for Controlling and Monitoring a Web-Cast, filed on Jun. 7, 2002, the contents of which are incorporated herein by reference.

BACKGROUND OF THE INVENTION

1. Field of the Invention

The invention relates generally to the field of Web-cast events and, more particularly, to a method and system for controlling and monitoring a Web-cast event.

2. Description of Related Art

Increasingly, information and entertainment content is being disseminated via the communications infrastructure, including the Internet and other communications networks. Recently, content providers have turned to broadcasting via the Internet, known as "Web-casting," as a viable broadcast option. Various events from live corporate earnings calls, to live sporting events have been broadcast using the Internet and streaming video/audio players.

Generally speaking, Web-casting is the transmission of live or pre-recorded audio or video to personal computers or other computing or display devices that are connected to the Internet and/or other global communications networks. Web-casting permits a content provider to bring both video and audio directly to the computer of one or more end users in formats commonly referred to as streaming video and streaming audio. In addition to delivering entertainment content, Web-casts are increasingly being employed to deliver various business related information to end users. For example, corporate earnings calls, seminars, and distanced learning content are being delivered via Web-casts. The Web-cast format is advantageous because a multimedia presentation that incorporates various interactive components can be streamed to end users all over the globe. In addition to streaming media, Web-cast events can comprise other multimedia components, such as, for example, slide shows, Web-based content, such as FLASH and SHOCKWAVE presentations, interactive polling and questions, to name a few.

Web-cast events can be broadcast live or played back from storage on an archived basis. To view the Web-cast event, the end user must have a streaming-media player, such as for example REALPLAYER provided by RealNetworks, Inc., or WINDOWS MEDIA PLAYER provided by Microsoft Corporation, loaded on their computing device. Furthermore, Web-casts that include other multimedia content such as slides, Web content and other interactive components typically require the end user to have a Web browser, such as NETSCAPE NAVIGATOR provided by Netscape Communications Corp., or INTERNET EXPLORER, provided by Microsoft Corporation. In general, the streamed video or audio is stored on a centralized location or source, such as a server, and pushed to an end user's computer through the media player and Web browser.

A deficiency with many Web-cast event broadcasting systems is that if a business client wishes to broadcast an audio feed from a remote location as the primary feed into the Web-cast event, a relatively large amount of broadcast equipment and components are needed at the remote location to generate the audio feed. For example, audio capture and converter hardware is needed at the remote location to facilitate the generation of an audio feed into a Web-cast event from a remote location.

Another limitation of Web-cast event broadcasting systems is that, at the broadcast center, prior to the event, a technician must spend a relatively lengthy period of time manually setting up and configuring various encoders and related communications hardware so that the proper feeds and signals to participants in the Web-cast event will be properly set up. Additionally, the Web-cast event must be initiated by a technician at the broadcast center, and not by a user at a remote location.

Furthermore, Web-cast event broadcasting systems require a relatively large amount of hardware at a broadcast center, for example, multiple hardware cards to receive packetized data at the encoder server, and these hardware devices require a relatively large amount of rack space in the encoder servers at the facilities of the broadcast center.

Still further, the quality control of a Web-cast event requires constant monitoring by a technician and thus requires a relatively large amount of human resource time and is subject to a great deal of human error. As such, a need exists for an improved system and method for controlling and/or providing a Web-cast.

SUMMARY OF THE INVENTION

The present invention satisfies this need. Various embodiments of the present invention provide for the control of and delivery by a business client of content for an event, whether on a live or archived basis, to end users via a telephone. In addition, certain embodiments of the present invention enable a business client to monitor a Web-cast event via a telephone.

According to an exemplary embodiment of the present invention, a system for providing control and monitoring of a Web-cast event generally comprises a server system that is capable of receiving content and instructions via a telephone and, in response thereto, transmitting the content to the end users. The server system may be communicatively connected to a telephone; audio content may be provided by a business client from the telephone to the server system for processing, storing, and transmission of the audio content to end users.

Generally, the Web-cast control and monitoring system comprises one or more servers programmed and equipped to receive content data from an external source, such as a telephone, convert the content data into a streaming format, if necessary, store the data, and deliver the data to end users as a Web-cast event. The business client may initiate, provide the primary feed for, and monitor the Web-cast event from a telephone. Generally, the Web-cast control and monitoring system comprises one or more Web servers for allowing the business client to configure a Web-cast event; one or more telephony servers for receiving and converting content data and also for controlling other servers; one or more encoder servers for encoding the converted content data; one or more file storage servers for storing the content; and one or more media servers for converting the encoded content into streaming content, so that it may be delivered to an end user's computer.

Accordingly, a live audio feed can be received from a business client using a telephone and formatted for delivery through interfaces and received by end users. In this way, a business client can initiate, control, and monitor an event. For example, a business client who is traveling can call a designated telephone number using a wireless phone and initiate a Web-cast event. By way of further example, a business client can provide the primary feed for a Web-cast event from a wireless phone. As can be seen, the present embodiment satisfies the need for a telephone-controllable Web-cast event.

By providing control, input and monitoring of a Web-event from a telephone, business clients can access, control, monitor and participate in various events, including Web-cast events while at work, at home, or on the road. For example, a business client who is on the road may call into the system at a designated time, initiate a Web-cast event, and provide a primary voice feed for the end users of the Web-cast event. Thus, the various embodiments of the present invention overcome the limitations of present content delivery systems.

Other objects and features of the present invention will become apparent from the following detailed description, considered in conjunction with the accompanying system schematics and flow diagrams. It is understood, however, that the drawings, are solely for the purpose of illustration and not as a definition of the limits of the invention, for which reference should be made to the appended claims.

BRIEF DESCRIPTION OF THE DRAWING FIGURES

In the drawing figures, which are merely illustrative, and wherein like reference numerals depict like elements throughout the several views:

FIGS. 5A-5D are flow diagrams of a process for remotely initiating a Web-cast event from a telephone.

DETAILED DESCRIPTION OF THE EXEMPLARY EMBODIMENTS

There will now be shown and described in connection with the attached drawing figures several exemplary embodiments of a system and method of providing control, input and monitoring of a Web-cast event.

Figure 1A:
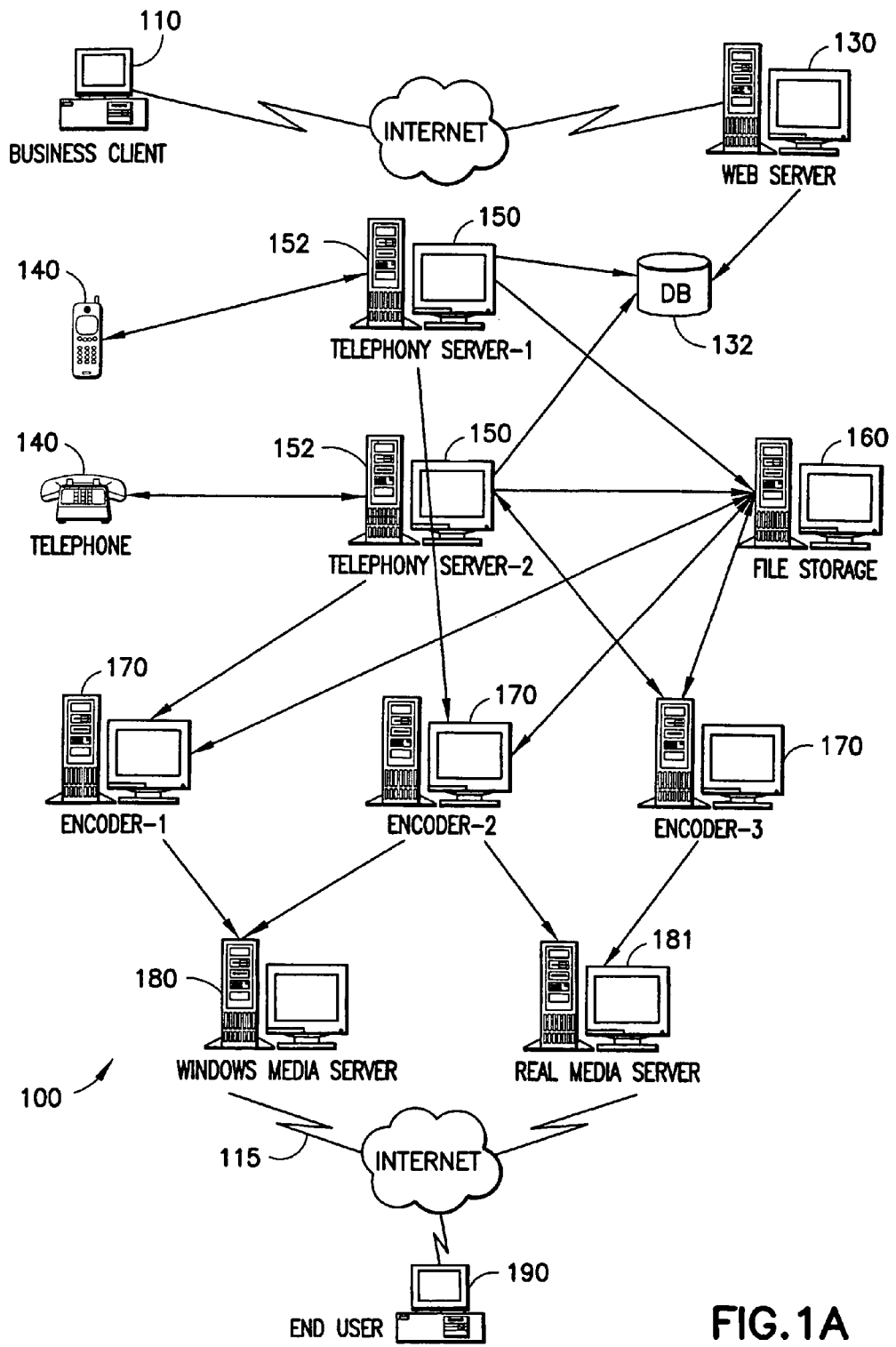
FIG. 1A is a schematic diagram of an overview of a exemplary embodiment of the system architecture of a Web-cast control and monitoring system in accordance with the present invention.

With reference to FIG. 1A, there is shown an exemplary embodiment of a Web-cast control and monitoring system 100 in which a business client (in the present embodiment, the person(s) producing the content to be delivered to prospective end users) can control and monitor a Web-cast. The Web-cast control and monitoring system 100 generally comprises one or more servers programmed and equipped to receive content data from a business client via an external source, such as a telephone (wired or wireless) 140, convert the content data into a streaming format (if necessary), store the data, and deliver the data to end users as a Web-cast event. The business client may initiate, provide the primary content data or feed for, and monitor the Web-cast event from telephone 140. In the present embodiment, the term "event" or "Web-cast" generally refers to the broadcast via a global communications network of any combination of video, audio content and/or multimedia content, such as, by way of non-limiting example, slide presentations, interactive chats, Web content (e.g., FLASH presentations) questions or polls, and the like.

More specifically, the Web-cast control and monitoring system 100 comprises: one or more Web servers 130 for allowing the business client to configure a Web-cast event; one or more telephony servers 150 for receiving and converting content data and also for controlling other servers (as described below); one or more encoder servers 170 for encoding the converted content data; one or more file storage servers 160 for storing the content; and one or more media servers 180, 181 for streaming the content so that the content may be delivered to one or more end user computers 190.

It will be understood that each of the servers 130, 150, 160, 170, 180 and 181 is communicatively connected via LAN or WAN via an interface. In the present embodiment, the term "interface" generally refers to any device or function for connecting devices and/or communications paths, including but not limited to modulators, demodulators, modems, switches, and the like. In turn, telephony servers 150 are in communication with one or more telephones 140. Similarly, media servers 180, 181 are in communication with various end user computers 190, via a network, such as the Internet, so as to deliver the Web-cast event to end users.

Telephony server 150 is preferably implemented in one or more server systems running an operating system (e.g., Windows NT/2000 or Sun Solaris) and being programmed to permit telephony server 150 to receive telephone, or audio content data on a live basis. Telephony server 150 functions to format the raw content so that it can be transmitted to file storage server 160, where it may then be pulled by encoder servers 170 and encoded. The content data, in the case of analog voice data, is then converted into a format capable of being encoded by encoder server 170.

The telephony server 150 is preferably equipped with an audio content capture device or card 152, which is communicatively connected to external sources such as telephones 140. Capture device or card 152 enables telephony server 150 to receive telephone data from an external source such as a telephone 140 and convert the data into a digitized, compressed, and packetized format.

One or more capture devices 152 may be implemented in telephony server 150 as a matter of design choice to enable telephony server 150 to receive multiple types of content data. By way of non-limiting example, capture devices 152 may be any telephony capture device, such as for example the DIALOGIC PCI board offered by Intel Corp., or any video/audio capture device known in the art. The capture devices 152 may be used in combination or installed in separate servers as a matter of design choice. For instance, any number of capture devices 152 and telephony servers 150 may be utilized to receive audio content data from telephones 140, as are necessary to handle the broadcasting loads of Web-cast control and monitoring system 100.

It is to be understood that the telephones 140 may be any device capable of transmitting telephone or audio data to the Web-cast control and monitoring system 100. By way of non-limiting example, telephones 140 may include, but are not limited to, telephones, cellular or digital wireless phones, satellite communications devices, and the like. It is further to be understood that a client may use the same or different telephones at each of the different steps of the process described herein. The audio data may be received by Web-cast control and monitoring system 100 through a communications network, such as, by way of non-limiting example, the Public Switched Telephone Network (PSTN), a wireless network, a satellite network, a cable network, or transmission over the airwaves or any other suitable communications medium. In addition, content described herein as being delivered via telephone may include other types of data besides audio data such as video data or other types of data as known in the art.

In an embodiment of the invention, the term "communications paths" or "communications network" refers generally to any communication network or link, including but not limited to a network using a data packet transfer protocol (such as the Transmission Control Protocol/Internet Protocol ("TCP/IP"), User Datagram Protocol/Internet Protocol ("UDP/IP")), a plain old telephone system ("POTS"), a cellular telephone system (such as the Advance Mobile Phone Service ("AMPS")), a digital communication system (such as GSM, TDMA, or CDMA) or any other now known or later-developed technology or protocols. Accordingly, while an exemplary embodiment of system 100 may provide content to end users via the Internet, content may also be provided via other networks such as, for example, internal corporate local area networks ("LANs") or wide area networks ("WANs").

As described in greater detail below, the business client (e.g., a company and/or an individual) may use a Web-cast content administration system ("WCCAS") to setup the Web-cast. The WCCAS may be a software program which, in an exemplary embodiment, resides on Web server 130 (or telephony server 150) and may be accessed by a business client from business client computer 110. In an exemplary embodiment, the business client may use the business client computer 110 to log on to Web server 130 via a network, and setup the Web-cast using the WCCAS. The business client may first setup an account by providing business information such as, for example, the name of the business, the business address and other contact information and banking and other credit information. After the account is setup, the business client may login to the system and setup the Web-cast. When the business client schedules an event, the event parameters, such as type of event, length of event and event starting time are configured at Web server 130, and stored in an event parameter database 132. After various parameters defining and configuring the Web-cast are selected, a telephone access number and access code or PIN are provided to the client via the WCCAS.

Telephony server 150 is pre-configured to receive the content data. Depending on the format of the raw content (standard telephone signals in the present embodiment), telephony server 150 functions to format the raw content so that it can be transmitted to file storage server 160, where it may then be pulled by encoder servers 170 and encoded. In the case of standard telephone signals, telephony server 150 digitizes, compresses, and packetizes the signal. Generally speaking, the telephone signal is converted to a VOX or WAV format of packetized data, although other now-known or later-developed formats may be used. The packetized data is then transmitted to file storage server 160. Encoder server 170 pulls the packetized data from file storage server 160 as instructed by telephony server 150. Telephony server 150 may instruct encoder server 170 to pull data from file storage server 160 by sending an HTTP request to the encoder server 170, allowing encoder server 170 to reference and pull the appropriate data from file storage server 160.

In the present embodiment, the VOX or WAV files generated from the telephone are processed using a file driver system for providing the audio data to the encoder server 170 in the appropriate format as required by encoder servers 170. Accordingly, the need for an audio driver card at the encoder server, such as, for example, those audio cards provided by Antex Electronics Corp., is eliminated. When the Web-cast event is initiated to start streaming by the business client, the telephony server 150 may start receiving the voice data and the received data is written to a file on file storage server 160. As soon as the telephony server 150 starts receiving the data, the telephony server 150 sends a command to all the encoders 170 allocated for that passcode to start pulling or reading the data from that file. The File driver, which is loaded by the encoders 170, gets this command and will take up the responsibility to read the file and feed the audio data to the encoder 170 in chunks to encode this voice data to a streaming format. Thus, the number of audio channels capable of being handled by each encoder server 170 is not limited to the physical number of slots available for audio cards on encoder server 170. The file driver system may be designed and configured, for example, as that described in U.S. patent application Ser. No. 09/859,562, hereby incorporated by reference.

Encoder server 170 is preferably a standalone server system interconnected to both telephony server 150 and media server 180 via a LAN or WAN. It will be understood, however, that the functionality of the encoder server 170 can be implemented on another server, such as telephony server 150, or media servers 180, 181. Conversely, to handle large amounts of traffic, any number of encoder servers 170 may be used to handle traffic on the Web-cast control and monitoring system 100. Encoder server 170 is programmed to encode the converted audio content into a streaming media format. Encoder server 170 is preferably programmed with encoding software capable of encoding digital data into streaming data. By way of non-limiting example, such encoding software is available from Microsoft Corporation and RealNetworks, Inc., for encoding into Windows Media or RealPlayer format, respectively. As with other processes described herein, one skilled in the art will recognize that the process of encoding audio and video data into streaming media formats may be performed in any number of ways now known or hereafter developed. Once the content has been encoded into a streaming media format, it is passed to an appropriate media server 180, 181 (in accordance with the particular streaming format used) where it is stored and made available to end users, who receive the Web-cast on their end user computers 190. Preferably, the users may log into a Web page created for the Web-cast by the business client by use of the WCCAS, as discussed above, on Web server 130 and/or business client computer 110. For convenience, the present embodiment segregates content by media format; one or more servers for Windows Media 180 and one or more servers for RealPlayer 181.

Web server 130 may be interconnected to telephony server 150 and file storage server 160 via a LAN or WAN. Media server 180, 181 may also be communicatively connected to end user computers via a communications network, such as the Internet.

The system 100, shown in FIG. 1A, may also include one or more file servers (not shown) that are used to provide on-demand streaming (or other delivery) of content to the end user.

Furthermore, in an embodiment of system 100, components of system 100 may be arranged such that some of the system components reside in a first country, while other components reside in a second country. For example, Web server 130 and database 132 may reside in the first country, while other components such as telephony server 150, encoder server 170, file storage server 160, and media server 180, 181 reside in the second country, local to the business client and end users of a particular Web-cast. In such a scenario, management of the Web-cast could be performed in the first country, while the relatively high bandwidth needs of content transmission could be performed locally in the second country. In this manner, management of the Web-cast could be performed in the first country, while efficiencies of bandwidth and increased performance (as opposed to long-distance transmission of large bandwidth content) may be obtained.

Although not depicted in the figures, the servers described herein generally include such other art recognized components as are ordinarily found in server systems, including but not limited to CPUs, RAM, ROM, memory, clocks, hardware drivers, interfaces, and the like. The servers are preferably configured using the Windows®NT/2000, UNIX or Sun Solaris operating systems, although one skilled in the art will recognize that the particular configuration of the servers is not critical to the present invention. Furthermore, different tasks, illustrated herein as being performed on separate and distinct servers, may, in some embodiments, be performed on the same server. Conversely, individual tasks, illustrated herein as being performed on a single server, may be distributed among several servers.

Figures 1, 1B:
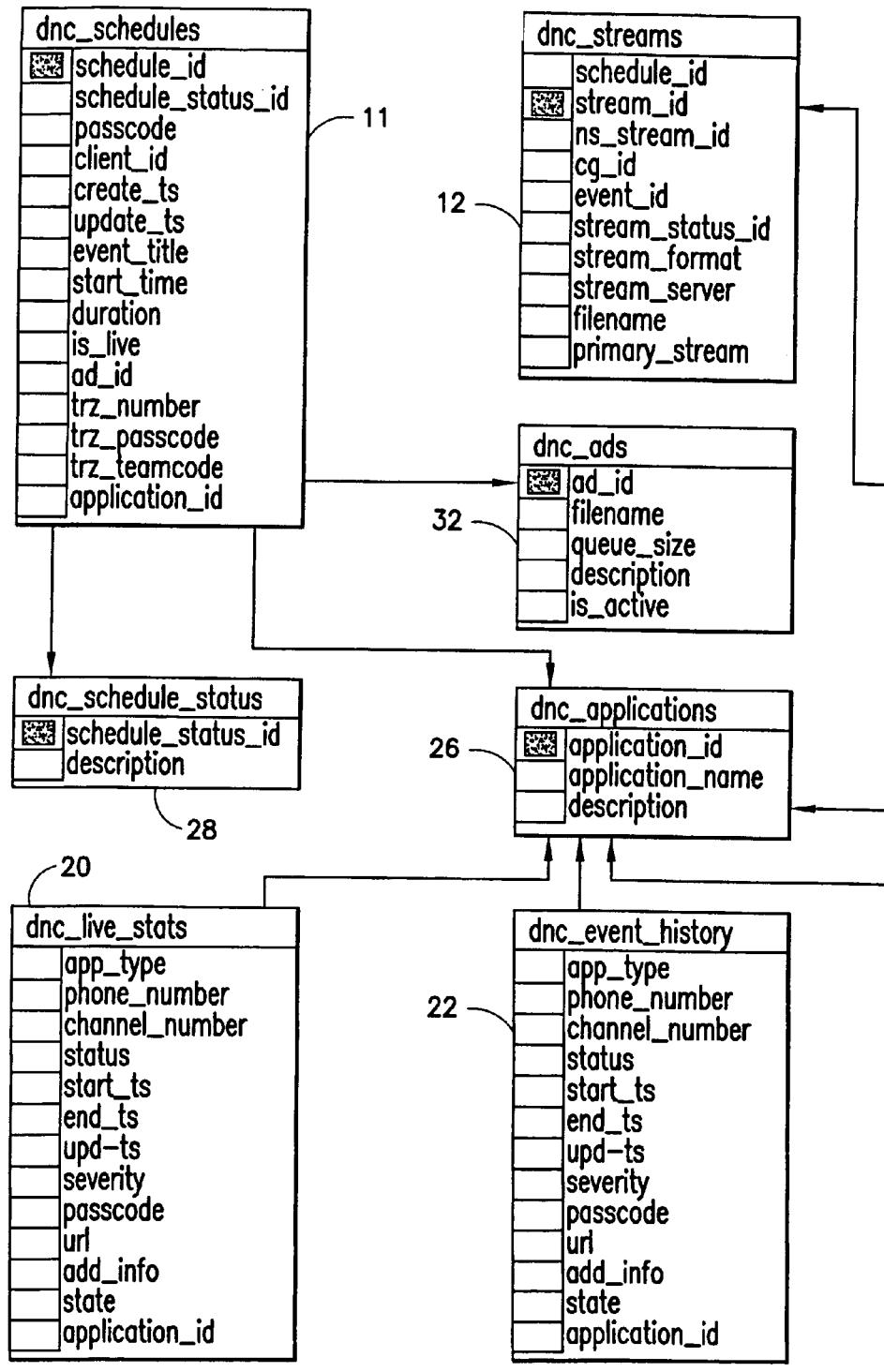
FIG. 1B is a block diagram depicting exemplary database configuration tables for the present invention.

Turning to FIG. 1B, one possible arrangement of tables 10 of the database 132 is shown. In general, these tables 10 contain event parameters and other data for configuring, presenting and monitoring a Web-cast. Not shown are tables storing information relating to each client, as identified by unique client IDs. Such client information includes, for example, identifying information (e.g., address, e-mail address and other contact information), ID(s), passwords and the like. It will be understood that such client information may be collected and/or assigned during an initial client registration process, for example, via an application on the Web server 130.

Event parameter tables 10 may include, by way of nonlimiting example, an event schedules table 11, that includes parameters related to the business client event information and passcode information. Parameters in that table may include, for example, a schedule_id parameter, that identifies a scheduled event, a schedule_status_id parameter containing information regarding the status of a planned event, and a passcode parameter, that allows access to the system by the business client when entered via a telephone. These parameters also may include a client_id parameter, that is used to retain the identity of the business client, a create_ts parameter, for keeping track of the time the Web-cast event is created, an update_ts parameter, for keeping track of the time that an event is updated, and an event_title parameter, that serves to identify a particular event with a title or name. The start_time parameter is used to designate the starting time of an event, while the duration parameter keeps track of the scheduled time period for the event. The is_live parameter comprises information about the live status of the event, while the trz_number, trz_passcode and trz_teamcode parameters are used to store password and team information related to a support team at the broadcast center.

Another exemplary event parameter table is streams table 12, that includes different stream formats for a given scheduled event. Parameters in that table may include a schedule_id parameter, that provides for identification of a scheduled event, and a stream_id parameter, for identifying a data stream used in the Web-cast event. Additional parameters related to the data stream are the ns_stream_id and stream_status_id parameters, for indicating the status of the data stream, stream_format parameter, for identifying the specific format of the data stream, a primary_stream parameter for indicating the designated primary data stream, and a stream_server parameter, for indicating a server system that will facilitate use of the data stream. Other parameters that may be used in this table are the event_id and filename parameters, for identifying and designating a name or title for a particular Web-cast event.

Another exemplary event parameter table is an encoder session table 14, including encoder session information, and corresponding stream formats, for an event. Parameters in that table may include an encoder_session_id parameter, that retains information regarding a scheduled use of an encoder server, an encoder_status_id parameter, that indicates whether an encoder server is in use, an event_id and start_ts parameters, for indicating the time at which an event starts, respectively, an update_ts parameter, that indicates the time that event configuration data is updated, and a vox_file, for tracking the vox format audio files. Additionally, the archive_file parameter indicates the location of the archived audio files. The input_file parameter is used for additional file management, and the codec_name and stream_id parameters indicate information about the codec used and the name of the designated information stream, respectively. Additionally, the encoder_type parameter retains information about the type of encoder server used for a particular Web-cast. Identification and classification of the event is facilitated by the description and keyword parameters while the port and enable_push parameters serve to maintain identifying information regarding the used data ports and the enabling of pushing (transfer) of data.

Another exemplary event parameter table is encoders table 16, that includes information regarding capabilities of the various system encoders. That table may include, for example, an encoder_id parameter, that serves to identify an encoder server to be used during a particular Web-cast event. The audio_index and video_index parameters designate information regarding audio and video portions of a Web-cast, respectively, while the resource_id parameter serves to provide information regarding available resources at the broadcast center.

Still another example of an event parameter table is phone table 18, that includes information about phones in the system and their corresponding channels, as well as information for monitoring an event.

Parameters in those tables may include phone_id, phone_number and phone_type_id parameters that designate a phone identification, a corresponding phone number, and the type of phone that is used in conjunction with a telecast. Other parameters that may be included in those tables are a channel_no parameter, that indicates the communication channel used, a machine_name parameter, that indicates a device or devices used during the Web-cast, and an is_active parameter, for retaining the active status of the Web-cast session.

Still other exemplary event parameter tables include a live status table 20, event history table 22 and event error history table 24. Parameters in these tables may include an app_type parameter, that designates other applications that may work in conjunction with the Web-cast, a phone_number parameter, that retains the phone number used for a telecast portion of the Web-cast, and a passcode parameter, that maintains the passcode entered by the business client when initiating a Web-cast from a telephone. Other parameters that may be included in this table are a channel_number parameter, that indicates the communication channel used for communications, a status parameter, indicating the operating status of a particular Web-cast, and start_ts and end_ts parameters, for designating the beginning and end times of a scheduled Web-cast, respectively. Further, other parameters used may include an upd_ts parameter, indicating the time of updates to the Web-cast configuration, the add_info parameter, that indicates added or modified information pertaining to the Web-cast, a state parameter, indicating the operational state of the Web-cast, and, if a problem arises, the severity parameter designates to what degree or level a problem exists. The url parameter designates an appropriate Web address with respect to the Web-cast, while the application_id parameter designates other applications that may be used in conjunction with the Web-cast system.

Additionally, the event parameter tables may include applications table 26, that includes information regarding various applications that may integrate with the system of the present invention. Parameters that may be included are app_type, application_name and application_id parameters, that provide information regarding the type of application, its name, and the designated identifier of applications to be used in conjunction with the Web-cast system. For added clarity, the description parameter designates a name or title for the application.

Additionally, the event parameter tables may include schedule status table 28, that includes information regarding Web-cast event scheduling status and descriptions. Parameters that may be included are schedule_status_id and description, that designate the current scheduling status and a description of the scheduled event.

Additionally, the event parameter tables may include dnc_appsettings table 30, that includes information regarding the various applications that may integrate with system 100. Parameters that may be included are app_id, app_key, app_value, description and application_id, which provide identification, value, key indexing and description information related to the applications.

Additionally, the event parameter tables may include dnc_ads table 32, that includes information regarding the various ads that may be streamed into the Web-cast as, for example, a secondary feed. Parameters that may be included are ad_id, filename, queue_size, description and is_active, which provide status, name, queue size, description and active status of the ads and related ad data that may be streamed into the secondary feed of the system 100.

Additionally, the event parameter tables may include dnc_encoder_status table 34, that includes information regarding the various encoder servers 170, and their status. Parameters that may be included are encoder_status_id and description, which provide status and identification for the various encoders used during the Web-cast.

Moreover, other additional parameter tables may be used as part of the present invention, and not all of the discussed tables need be included. Additional parameters may be included, and not all of the described parameters need be used. It should be understood that the logical arrangement and number of the tables and data therein may vary and that the selection and choice of tables and parameters is an application-specific matter of design choice for one skilled in the art.

Figures 1, 1B, 2:
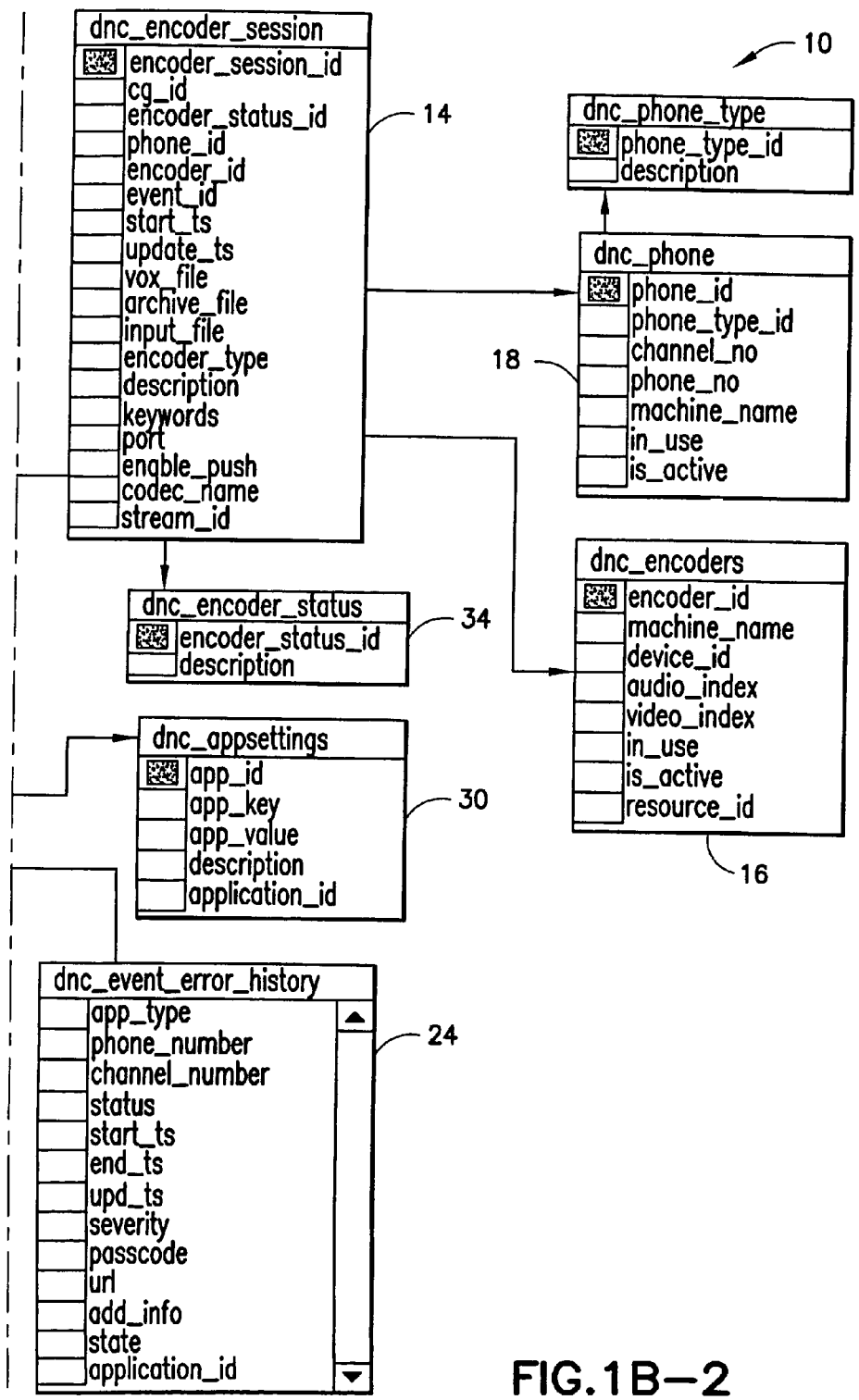
FIG. 2 is a flow diagram of a process of configuring the Web-cast control and monitoring system of FIG. 1A to capture content from external sources in accordance with an exemplary embodiment of the present invention.
Figure 2:
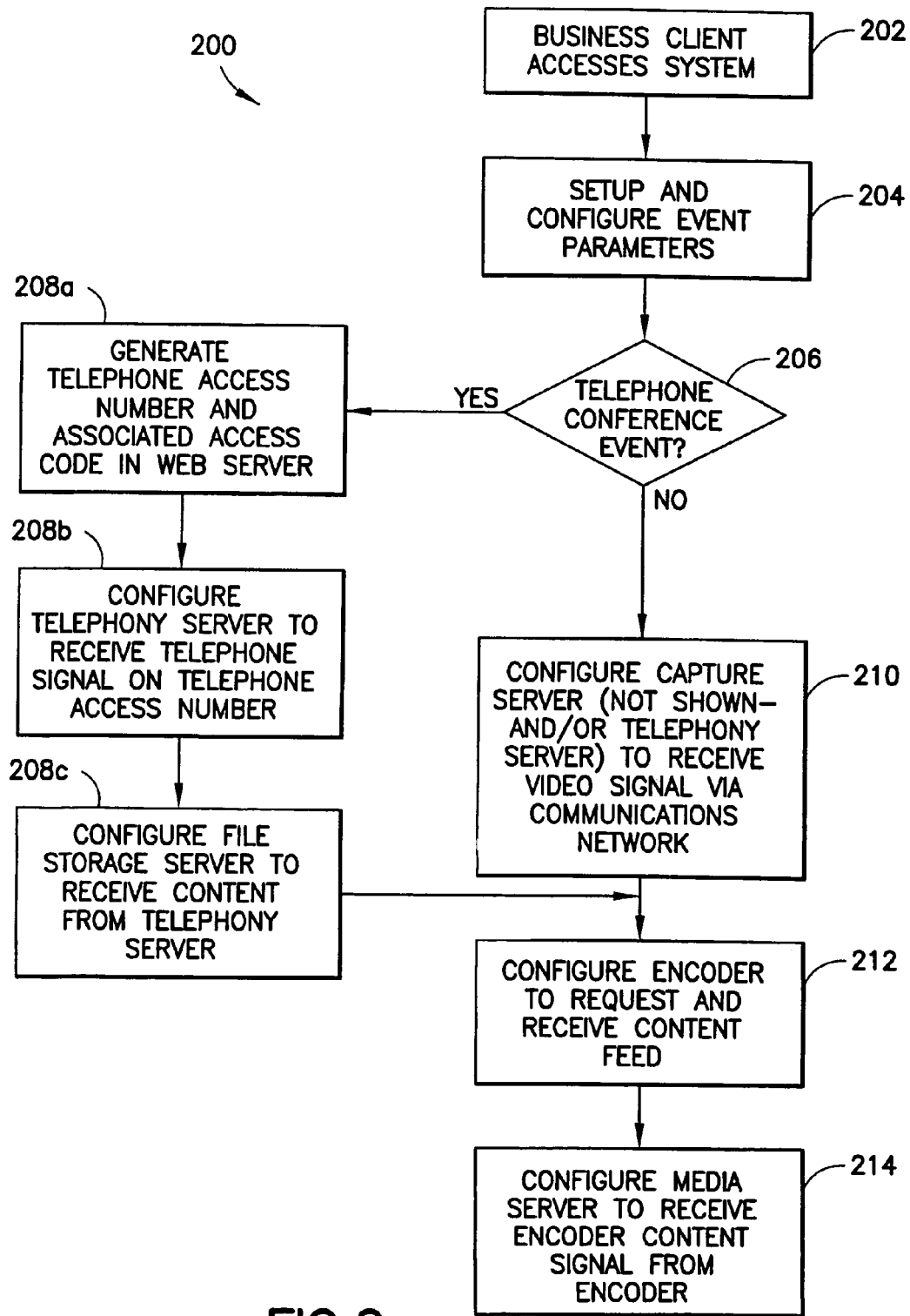

With reference to FIG. 2, there is shown a flow diagram of an exemplary process 200 of configuring a Web-cast on the Web-cast control and monitoring system 100.

In a first step 202, a business client accesses the WCCAS software on Web server 130 via the business client computer 110. The WCCAS functions to receive data from the business client regarding a particular event and to configure the system 100 according to the received data. The WCCAS may exist in a variety of embodiments, including that described in International Patent Application No. PCT/US01/47058, hereby incorporated by reference. The business client computer 110 is communicatively coupled, such as via the Internet, with Web server 130. Web server 130 facilitates storage of the event parameters in tables 10 (see FIG. 1B) in database 132.

In step 204, as prompted by Web-pages and forms generated by the WCCAS, residing on the Web server 130, the business client provides the event parameters that include information such as, for example, the time of the event, the look and feel of the event (if graphical), content type, as well as other parameters as discussed above with respect to the event parameters in parameter tables 10, etc. The WCCAS software receives all of the Web-cast configuration data from the business client and if the event is a telephony event communicates this information to telephony server 150 through XML messaging. In an embodiment of the invention, the WCCAS system may reside at telephony server 150, or another separate server (not shown) or in Web server 130. In step 206, the WCCAS determines whether the event is a telephone conference event, i.e., the content data is voice data as generated by a telephone. If the event is a telephone conference event, then the WCCAS generates a telephone access number and associated access code or PIN to be used by the business client in establishing a connection with the Web-cast control and monitoring system 100, in step 208*a*. Specifically, if the client plans to control, monitor, or provide the primary feed for a telephone conference event, a telephone access number and PIN may be generated for that designated purpose. In step 208*b*, telephony server 150 is configured to receive the telephone signal on the particular telephone access number. In the present embodiment, WCCAS does not allocate any specific port on the telephony server. When the client calls in, the available channel will be picked. In another embodiment, the WCCAS may allocate a communication port at the telephony server 150 associated with a particular telephone access number. Additionally, encoders 170 may be allocated to the passcode based on the specific characteristics, (e.g., data formats, needed bandwidth) of the configured Web-cast. Backup encoders may also be allocated, based upon the predicted data needs and importance of a specific Web-cast.

File storage server 160 is also configured to receive content from telephony server 150, in step 208*c*.

Alternatively, if the event content will be received via a video or audio feed, then in step 210 the telephony server 150, or alternatively, a capture server (not shown) may be configured to receive the video signal via a communications network from a video camera or other suitable video device. Monitoring and control, however, may still be performed from a telephone, if desired, by the client.

In step 212, encoder server 170 is configured to pull the content data from file storage server 160 as instructed by telephony server 150. Similarly, media servers 180, 181 are configured to receive the encoded content data from encoder server 170, in step 214. One skilled in the art will recognize that the process of configuring the servers can be performed in any number of ways as long as the servers are in communication with each other and have adequate resources to handle the incoming content data.

Telephone Feed Capture

Figure 3:
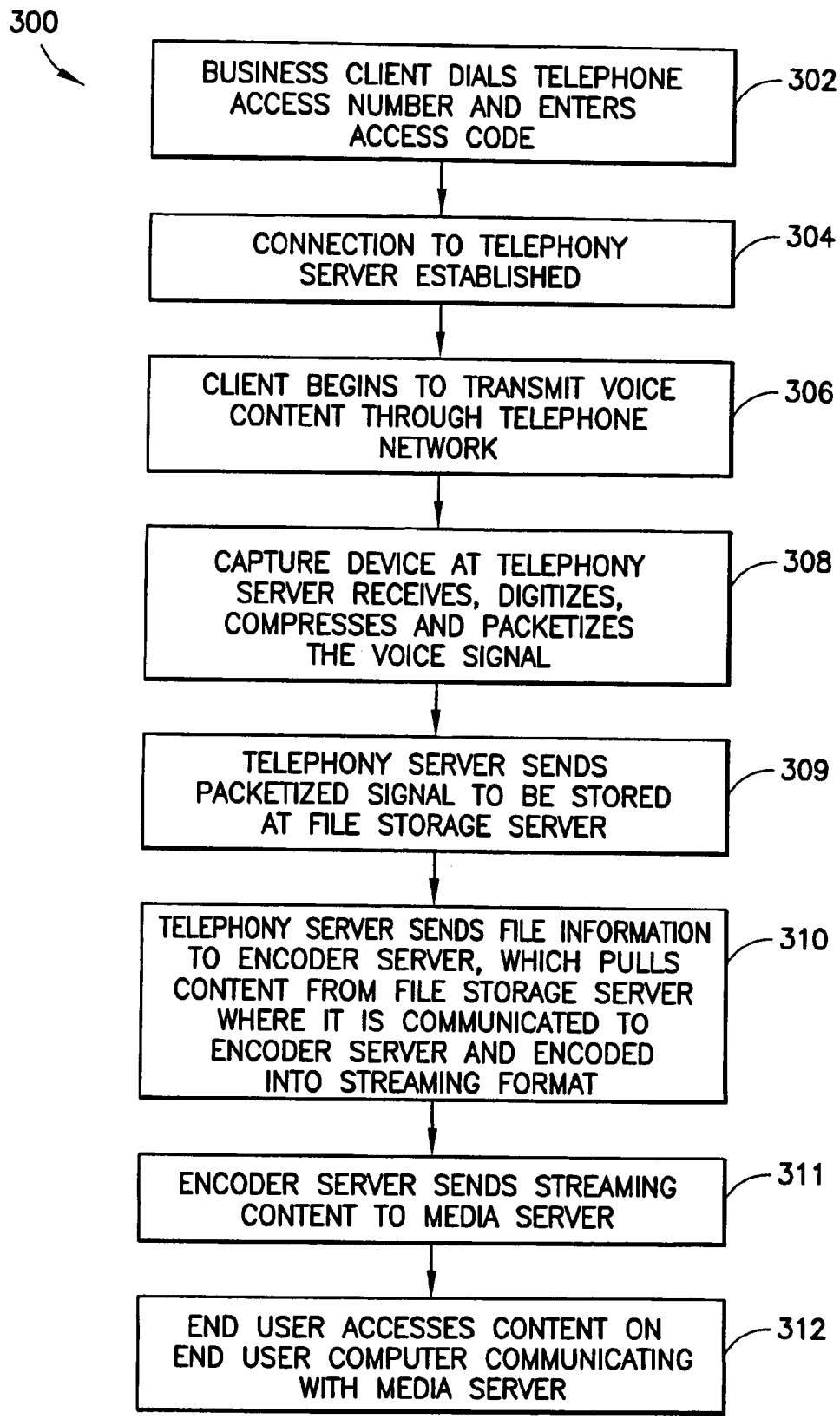
FIG. 3 is a flow diagram of a process of capturing live voice data in accordance with an exemplary embodiment of the present invention.

An exemplary process 300 of capturing voice content from a telephone call will be described with reference to FIG. 3. As discussed above, prior to hosting a live Web-cast, system 100 is configured to receive the content data and make it available to end users. Generally speaking, the capture device 152 of telephony server 150 is configured to receive the content from a specified external source or telephone 140. By way of example only, software (e.g., the WCCAS) operating on system 100 assigns a unique identifier (or PIN) to a telephone access number associated with a telephone line hard-wired to the capture device 152. Capture device 152 preferably includes multiple channels or lines through which calls can be received.

When an event is setup using the WCCAS, one or more lines are reserved for the event and the business client is given an access number to call to interface with the system. The business client uses the telephone access number and PIN with which to dial into telephony server 150 of the system 100 at the time the Web-cast, such as, for example, a conference call, is scheduled to take place. One skilled in the art will recognize that the process of setting up a Web-cast can be performed in any number of ways as a matter of design choice.

In anticipation of the conference call, the capture device 152 of the telephony server 150 is set to "standby" mode to await a call made on the specified telephone access line, in step 302. When the call is received, the content capture device 152 prompts the host to enter the PIN. If the correct PIN is entered, the data capture device 152 establishes a connection, in step 304, and begins to receive the content data from the business client from telephone 140, in step 306. In step 308, as the content data is received, it is digitized (unless already in digital form), compressed (unless already in compressed form), and packetized by programming on the capture device 152 installed at the telephony server 150. The above steps are performed in a manner known in the art. This functions to packetize the content data into IP packets that can be communicated via the Internet using TCP/IP protocols. In step 309, telephony server 150 sends the IP packets to file storage server 160.

In step 310, telephony server 150 sends file information to encoder server 170, which pulls content from file storage server 160 after which it is communicated to Encoder server 170 and encoded into streaming format. In an exemplary embodiment, encoders 170 may be deployed on an "as needed" basis. Load balancing of encoders and servers may also be achieved automatically by the system 100. In step 311, encoder server 170 sends streaming content to media server 180, 181.

Encoding applications are presently available from both Microsoft and RealMedia and can be utilized to encode the converted file into streaming media files. One skilled in the art will understand that while the present invention is described in connection with RealMedia and Windows Media Player formats, encoder server 170 can be programmed to encode the converted voice transmission into any other now known or later developed streaming media format. The use of a particular type of streaming format is not critical to the present invention.

In step 312, once the data is encoded into a streaming media format (e.g., .asf or .rm), it is passed to media server 180, 181. In a live event, the data is continuously received, converted, encoded, passed to media server 181, 181, and delivered to end users. During this process, however, content data is preferably recorded and stored on file storage server 160 so as to be accessible on an archived basis. The system 100 generally includes a database 132 and associated storage (such as a hard drive, optical disk, or other data storage means) having tables 10 (see FIG. 1B) stored thereon that manages various identifiers by which content is identified. An Id is further associated with the stream file's filename and physical location on database 132, an end user PIN, and other information pertinent to the content file such as the stream type, bit rate, etc. As will be described below, the Id is used by system 100 to locate, retrieve and transmit the content data to the end user.

Additional examples of parameters in the database 132 may include, as discussed above with respect to parameter tables 10, parameters in event schedules table 11, that includes parameters related to the business client event information and passcode information. Examples of those parameters are, for example, a schedule_id parameter, that provides for identification of a scheduled event, a schedule_status_id parameter containing information regarding the status of a planned event, and a passcode parameter, that allows access to the system by the business client when entered via a telephone.

Other examples of parameters included in database 132 are those in streams table 12, that includes different stream formats for a given scheduled event. Parameters in that table may include, for example, a schedule_id parameter, that provides for identification of a scheduled event and a stream_id parameter, for identifying a data stream used in the Web-cast event. Additional parameter tables and parameters stored therein may be included in database 132.

One skilled in the art will understand that as a matter of design choice any number and configurations of media servers 180, 181 and associated databases 132 may be used separately or in tandem to support the traffic and processing needs necessary at any given time.

Furthermore, as discussed below, in addition to providing an event feed, the event may be controlled and/or monitored by the business client from a telephone.

Having described the discrete processes of controlling and monitoring a Web-cast, operation of the system 100 in the context of an exemplary Web-cast will now be described with reference to FIGS. 5A-5D. The system 100 is configured generally as described above. An event may be configured by way of Web server 130 and an associated Web-cast content administration system (WCCAS). By way of a telephone, and the operation of a Monitor system, a client or technician may monitor a Web-cast event, pickup the line or "conference" into the event, automatically receive alerts, and switch or control the source of various feeds to the event. In the present embodiment, the monitor system may reside on the telephony server 150.

As an initial step, a business client creates or configures an event using the WCCAS event creation software system. (Step 510). This step may comprise, for example, the configuration process shown and described with reference to FIG. 2. As discussed above, once the event has been configured, the WCCAS generates a passcode and phone number that may be accessed by the business client via the WCCAS residing on web server 130 via business client computer 110. Subsequently, the business client may then, from a remote location, make a telephone call to the designated phone number and enter the passcode that was previously generated and sent to the business client. (Step 512). The system 100 then verifies the passcode by comparing the passcode entered by the business client to the passcode for the designated phone number stored in an appropriate one of parameter tables 10 in database 132. (Step 514). If the passcode is not valid, the telephony server 150 either ends the call or provides the business client with another chance to enter in a valid passcode. (Step 515). If a current passcode has been entered, telephony server 150 polls encoder 170 to determine if it has been started. (Step 518).

Upon dialing the designated telephone access number, the business client encounters a touchtone menu with audio prompts generated by software residing on telephony server 150. By choosing the appropriate touchtone commands, the business client may then make a selection from a menu of operations including providing and initiating a Web-cast.

Once the business client has selected the initiation of a Web-cast, the telephony server 150 sends a request to encoder server or servers 170, which are then preferably started, but may not have been in the case of, for example, a hardware failure. If the encoder or encoders 170 have not been started at this point, telephony server 150 sends a command that starts the necessary encoders 170. The system also preferably loads a secondary feed into file storage server 160 while archiving is initiated. Encoder 170 requests stored content for the secondary feed from file storage server 160 in accordance with parameters stored in parameter tables 10 in database 132. (Step 520). Audio content, archived (or stored) on file storage server 160 may be immediately pulled by encoder 170 for immediate streaming and may also remain available for future on-demand or other streaming. The telephony server 150, when receiving voice data from the business client, sends a command to the encoder server 170 and file storage server 160 to start archiving. The archiving is done as long the event continues, and archiving stops when the voice data stops. The telephony server 150 initiates both archive start and stop commands. The secondary feed, in general, supplies background or filler information that is broadcast to the event instead of the primary feed, which is the main content of the event. The secondary feed may include background music, advertisements, or other descriptive information. Such a secondary feed may be, for example, background or "house" music stored on an existing or separate server. If, however, the encoder has been started at this point, the primary feed, i.e., business client's content, is coupled to the encoder 150. Archiving of audio content to file storage server 160 is also initiated. (Step 522). The system then determines if the "automatic live" function has been enabled. The automatic live functions may be configured by the business client when initially configuring the Web-cast with the WCCAS software, as described above. When initially configuring the event, the business client may select either "yes" or "no" for the automatic live parameter. Parameters within parameter tables 10 in database 132 are queried to establish whether automatic live has been selected. The Web-cast will begin automatically, without further prompting by the business client, if automatic live has been selected (Step 524). The "automatic live" system is a program configuration at the application level and resides in the database 132. As different applications integrate into the system 100, they can configure their preferences at their application level. When "automatic live" is enabled for any application, telephony server 150, initiates the encoder server 150 to pick up the voice data from the VOX file storage through a command. If this parameter is configured as "yes," then a stream will be made live. For applications for which this configuration is not set, manual intervention is required to make a stream live. The automatic live function provides that the Web-cast will automatically commence an event, with encoder 170 pulling content related to a primary feed from file storage server 160 without further manual input or initiation by the business client. If the automatic live function is not selected, the encoders 170 will not pull content related to a primary feed unless further manually initiated. Further manual initiation may be accomplished by the business client by entering a specific touchtone code at phone 140, or by a technician at the broadcast center via either a touchtone command on a telephone 140, or via a technician computer work station (not shown).

If the automatic live function is not enabled at this point, the telephony server 150 issues a request to the encoder 170 to retrieve the secondary feed. (Step 526).

If the automatic live function is enabled or, in the case where the function is not enabled, if the secondary feed has been sent to the encoder 170, the event goes live, but with the secondary feed being sent to the end users at end user computer 190. At this point, the automatic Web monitor system becomes active. (Step 528). At this point, the technician may be automatically notified by the monitor function to begin listening in or otherwise monitoring the event to begin quality control and to insure that the system functions properly and that and at an optimum level. (Step 530).

The monitor function is provided by monitor software that resides, in an exemplary embodiment, on Web server 130. Alternatively, the monitor software may reside elsewhere in the system such as, for example, on a separate monitor server (not shown) communicatively coupled to database 132. As the Web-cast progresses, parameters in the parameter tables 10 in database 132 are updated. In an exemplary embodiment, the parameters are updated in real time or on near real time basis. For example, electronic circuitry at telephony server 150 may detect a line drop situation if the business client's telephone 140 should become disconnected from system 100 due to a temporary error, fault or transient in the telephone lines. In the event of such an occurrence, parameters in the dnc_live_stats, dnc_event_history and dnc_event_error_history tables, such as, for example, the status and severity parameters, would be updated to indicate the line drop fault status. The automatic monitor software, when polling the relevant tables 10 in database 132 would compare the actual parameter status to the desired parameter status, and in the event of a fault such as a line drop, would automatically alert the technician so that corrective action could be taken.

The system then switches the encoder to the primary feed, and the monitoring function remains active. The telephony server 150 sends a command to the encoder server 170, instructing the encoder server 170 to stop pulling audio content related to the primary feed from file storage server 160. A pointer is used to keep track of the location where encoding of the primary feed is halted, so that encoding of the primary feed may later resume from the place where it had left off. The telephony server 150 then sends a command to the encoder server 170 to pull content related to the secondary feed from file storage server 160. A file name stored in database 132 is associated with the secondary feed content and is passed to the encoder server 170 as part of the instruction from telephony server 150. The feed is changed through a command from the telephony server 150 to the encoders 170. When the telephony server 150 stops receiving the voice data because of a telephony hangup or line drop, a command will be sent to the encoders 170 to switch to the secondary feed. (Step 532). At this point, the primary event feed is active and is fed to end users of the Web-cast event. (As is shown is step 534).

As the primary event feed is fed to the end users, the technician may listen in and manually monitor the live audio on the primary event feed. (Step 536). The primary event feed then continues to be sent to the end user throughout the course of the Web-cast. (Step 538). Throughout the course of the Web-cast, the technician may periodically manually check on the live feed to make sure that the event is progressing properly. (Step 540). To monitor the primary event feed, the technician may begin "conferencing" into the primary event feed and allow for manually monitoring of the event. To conference into a Web-cast, the technician dials a specific phone number and enters appropriate touchtone responses to menu choices. Entry of the appropriate selections results in the technician being "conferenced" into the Web-cast event. (Step 542). Additionally, in the same manner, the business client may, from a remote location, use a telephone, and also "conference" into the event and request instructions or assistance from the technician if a problem is detected with the event. (Step 544).

At this point, the technician may switch the event from primary feed to the secondary feed so that any problems with the primary feed may be discussed with the business client without the discussions being part of the event being broadcast to the end users of the Web-cast. (Step 546). Accordingly, at this point, the secondary feed becomes active and is fed into the event. (Step 548). While the secondary feed is fed to the event, the support technician may pick up a line and talk with a business client who is calling in from a remote location via a telephone 140. (Step 549). The business client and the technician may then discuss any problems or questions with the event feed and both parties may work to resolve the issues that may have arisen. Once the business client and the technician have completed their conversation, the primary feed may be switched back to the Web-cast event. (Step 550). Generally, the party who initiated the conversation (technician or business client) is the party to switch the primary feed back to the Web-cast event. The switch may be made by the business client or technician by entering an appropriate touchtone code into telephone 140. The primary feed then once again becomes active and is fed to the end users. (Step 552). If at any point, during the Web-cast, a line drops out, indicating a hang up status, this situation will be automatically detected by the automatic monitoring system, as described above. Thus, the technician is liberated from the duty of manually listening to the entire Web-cast event, as the technician will be automatically alerted to any line drops or other technical problems (Step 554). Upon the detection of a line drop, the secondary feed is automatically fed to the encoder until the primary feed can be reestablished. (Step 556).

At this point the live event continues, but with the secondary feed instead of the primary feed being sent to end users. In this way, the continuity of the event is preserved and the participants in the event never received "dead air." At this point, the user may, from a remote location and while using a telephone, pick up the line, enter the appropriate passcode, and reconnect to the primary feed. (Step 560). If the business client becomes disconnected from the Web-cast event due to, for example, a service interruption in a telephone line, the business client can reconnect to the Web-cast event by entering an appropriate passcode, and seamlessly reconnect and resume providing a primary feed to the Web-cast event. The event may then proceed with a primary feed being reestablished at this point, with the secondary feed being fed to the event and a line drop status being detected, the system determines if the event is over. (Step 562). If the event is not over at this time, the system switches back to the primary event feed, and the primary feed is fed to the event. (Steps 564 and 566).

As the end of the event grows near (as is determined by reference by the system 100 to appropriate parameters in tables 10 of database 132) the automatic monitoring system automatically alerts the technician at the broadcast center to "conference" into the Web-cast and listen for the end of the event (Step 568). Upon being alerted, the broadcast center personnel or technician may conference into the event and monitor the end of the event. (Step 570).

As the event comes to an end, or if the event was determined to be over as shown in step 562, the technician at the broadcast center may manually disconnect the feed and end the event. The feed may be manually disconnected through entry of the appropriate touchtone code into the telephone 140. (Step 572).

In this manner the Web broadcast event may be initiated, monitored, and controlled by a user at a remote location by way of a telephone and a technician at the broadcast center will not monitor every portion of the event as the technician is alerted at opportune times when an event may soon be ending or if there are any problems related to the broadcast of the event.

Additionally, while this event has been described as being initiated externally by a user from a remote location by way of a telephone, the event may also be initiated by a technician at the broadcast center. In this scenario, the event, such as, for example, a sporting event, is scheduled and configured using a Web interface by a support technician at the broadcast center. (Step 580).

Once scheduled, the support technician at the broadcast center may initiate the Web-cast event via a telephone by dialing a designated telephone number and conferencing with the appropriate coupler number. (Step 582). In this scenario, an event such as, for example, a sporting event, may be broadcast from a remote broadcast center at the site of the sporting event. The event may be broadcast to the broadcast center via, for example, T1 lines. At the broadcast center, the technician may transfer the sporting event feed from the incoming T1 (or similar data line) onto a phone line at the broadcast center. The technician at the broadcast center, in effect, acts as a bridging agent between two "conferences." Thereafter, the technician may make use of the Web-cast control and monitoring system as described above. The event then proceeds with a check of the proper passcode in step 514 as discussed above, and the event then proceeds as discussed above.

Figure 4:
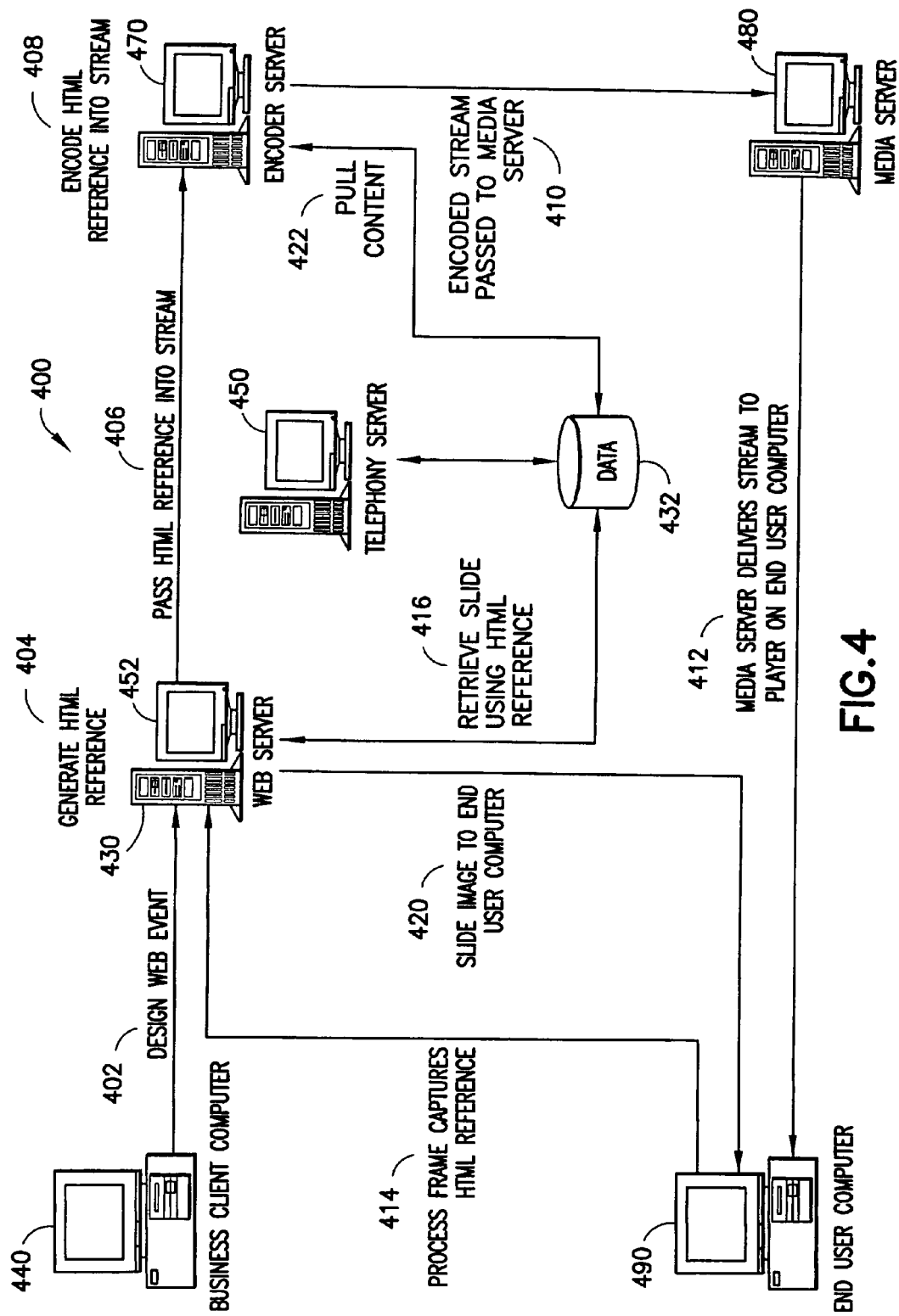
FIG. 4 is a flow diagram of a process of integrating non-streaming media into an event for delivery to an end user in accordance with an exemplary embodiment of the present invention.
Figure 5B:
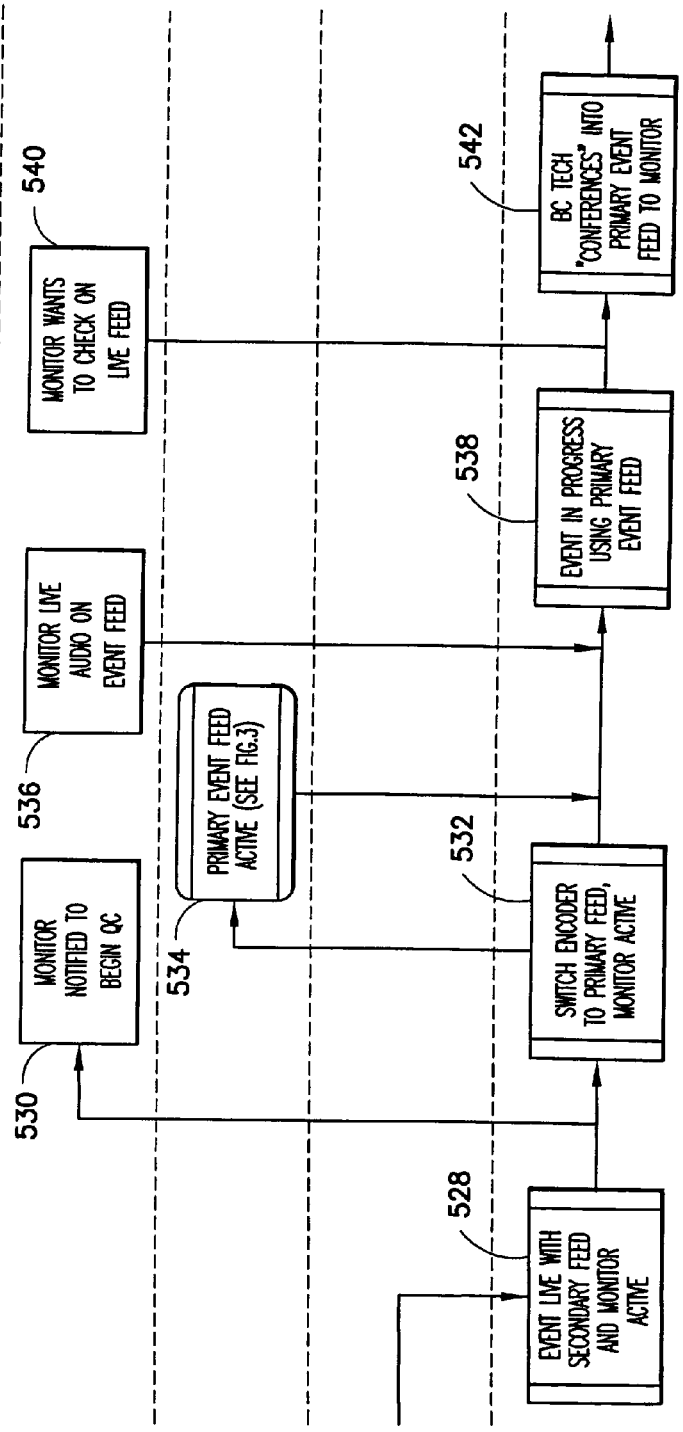

As noted above, it is to be understood that the foregoing embodiments may incorporate technology for pushing other than voice content to end users, including that described in International Patent Application No. PCT/US01/21366, hereby incorporated by reference. One such technology is shown in FIG. 4, in which a process of the system 400 allowing the business client to incorporate various media content into a Web-cast while it is running live is illustrated. Accordingly, any type of media content or other interactive feature could be incorporated into the event in this manner.

The business client may access the Web-cast administration functionality of the WCCAS software on web server 430 from business client computer 440 to design a mini-event to include in the live event, in step 402. Such a mini-event may include a slide show presentation, real-time polling of users, or a video presentation. The WCCAS software then generates an HTML reference file, in step 404. The HTML reference contains various properties of the content that is to be pushed to the multimedia player. For instance, the HTML reference includes, but is not limited to, a name identifier, a type identifier, and a location identifier. Below is an exemplary HTML reference:

http://Webserver.co.com/
process.asp?iProcess=2&contentloc="&sDatawindow&"&
name="&request.form("url")

The "iProcess" parameter instructs the "process" program (in the present embodiment, an application server page, although other technologies (both now-known and later-developed), such as .dll, could be used) how to handle the incoming event. The "contentloc" parameter sets the particular data window to send the event. The "name" parameter instructs the program as to the URL that points to the event content. During event preparation, the business client creates an event script which is published to create an HTML file for each piece of content in the mini-event. The HTML reference is a URL that points to the URL associated with the HTML file created for the pushed content. The WCCAS then passes the HTML reference to the live feed coming in to the encoder server 470, in step 406. Alternatively, the HTML reference may be stored at database 432 for retrieval by encoder server 470. Encoder server 470 then pulls content and the stored HTML references from database 432. The HTML reference file is then encoded into the stream as an event, in step 408. In this way, the HTML reference file becomes a permanent event in the streaming file and the associated content will be automatically delivered if the stream file is played from an archived database. This encoding process also synchronizes the delivery of the content to a particular time stamp in the streaming media file. For example, if a series of slides are pushed to the end user at different intervals of the stream, this push order is saved along with the archived stream file. Thus, the slides are synchronized to the stream. These event times are recorded and can be modified using the development tool to change an archived stream. The client can later reorder slides.

In step 410, the encoded stream is then passed to media server 480. Preferably, the HTML reference generated by the WCCAS software at Web server 430 is targeted for the hidden frame of the player on the end user's system. Of course, one skilled in the art will recognize that the target frame need not be hidden so long as the functionality described below can be called from the target frame. As shown above, embedded within the HTML reference is a URL calling a "process" function and various properties. When the embedded properties are received by the ASP script, the ASP script uses the embedded properties to retrieve the content or image from the appropriate location on the Web-cast content administration system and push the content to the end user's player in the appropriate location.

Next, media server 480 delivers the stream and HTML reference to the player on the end user computer 490, in step 412. The targeted frame captures and processes the HTML reference properties, in step 414.

In an exemplary embodiment, the name identifier identifies the name and location of the content. In an alternate example, the "process.asp" program accesses (or "hits") the database 432 to return the slide image named "slide1" to the player in appropriate player window, in step 416, although this is not necessary. The type identifier identifies the type of content that is to be pushed, e.g., a poll or a slide, etc. In the above example, the type identifier indicates that the content to be pushed is a JPEG file. The location identifier identifies the particular frame, window, or layer in the Web-cast player that the content is to be delivered. In the above example, the location identifier "2" is associated with an embedded slide window.

The content is then moved to the end user computer 490 in an appropriate window, in step 420.

By way of further example only, an HTML Web page or flash presentation could be pushed to a browser window. In one such embodiment, an answer to a question communicated by an end user could be pushed as an HTML document to a CSS layer that is moved to the front of the Web-cast player by the "process.asp" function. In this way, the client can encode any event into the Web-cast in real-time during a live event.

An embodiment of the system may also be designed such that it may be integrated with other business client applications through XML interfacing. Accordingly, mini-events from business client applications may be integrated into the Web-cast.

A benefit of the described invention is that a user may broadcast an audio feed as the primary feed into a Web-cast event, without the need for a relatively large amount of broadcast equipment and components being needed at the remote location to generate the audio feed.

Accordingly, by way of the described invention, a technician need not spend a large amount of time manually setting up and configuring various couplers and encoders so that the proper feeds and signals to participants in the Web-cast event will be properly set up. Additionally, the Web-cast event may be initiated by a business client using a telephone located at a remote location. In this manner, the technician at the broadcast center is liberated from the task of manually identifying encoder devices that are to be used, initiating the encoder devices as content is received from various couplers, as well as identifying and initiating various encoders for backup and archiving purposes. By way of the present system, these operations are handled automatically.

Furthermore, the amount of needed hardware at a broadcast center such as encoder hardware, and the amount of rack space at the encoder servers of the broadcast center is reduced. This is because the present Web-cast control and monitoring system uses, by way of non-limiting example, VOX files generated from the telephone as input and uses a unique file driver system as the driver for providing the audio data to the encoders in the appropriate format as required by the encoder servers. Accordingly, the need for an audio driver card at the encoder server, such as, for example an Antex audio card, is eliminated. Thus, the number of audio channels capable of being handled by each encoder server is not limited to the physical number slots available for audio hardware cards on the encoder server. Accordingly, fewer encoder servers may be needed.

Moreover, the quality control of a Web-cast event may be maintained without constant monitoring by a technician, reducing the amount of human resources and human error involved with monitoring the event.

While the invention has been described in connection with preferred embodiments, it will be understood that modifications thereof within the principles outlined above will be evident to those skilled in the art and thus, the invention is not limited to the preferred embodiments but is intended to encompass such modifications.

What is claimed:

1. A method of encoding and streaming content data to provide a Web-cast, using one or more telephones, the method comprising:
   receiving information indicative of Web-cast parameters;
   receiving content data from a first telephone;
   encoding the received content data into streaming content, wherein said Web-cast parameters identify a scheduled start time of the Web-cast and include an automatic-live Web-cast parameter, the automatic-live Web-cast parameter is used to determine whether encoding and feeding of the received content data for broadcast of the Web-cast is to be manually initiated or is to automatically commence at-the scheduled start time of the Web-cast identified by the Web-cast parameters;
   initiating broadcasting of the Web-cast's streaming content over a network in accordance with said Web-cast parameters, said initiating is either automatic or manual as specified by said automatic-live Web-cast parameter;
   automatically monitoring a status of the Web-cast with a monitoring system; and
   automatically updating the Web-cast parameters based on the status.

2. The method of claim 1, further comprising:
   storing the content data; and
   in accordance with said Web-cast parameters, automatically issuing a pull instruction, the pull instruction initiating encoding of content data into streaming content.

3. The method of claim 2, wherein the content data is received at a telephony server and stored in storage, the encoding is performed by an encoder server and the pull instruction is provided to the encoder server, thereby causing the content data to be retrieved by the encoder server from storage.

4. The method of claim 3, further comprising receiving Web-cast initiation instructions and wherein issuing the pull command is in response to receiving the initiation instructions.

5. The method of claim 4, wherein the Web-cast initiation instructions are received from a second telephone.

6. The method of claim 3, further comprising formatting the content data by the telephony server, wherein the content data is analog data, and formatting the content data includes digitizing and packetizing the analog data.

7. The method of claim 6, wherein formatting the content data includes formatting the content data into one or more WAV files.

8. The method of claim 6, wherein formatting the content data includes formatting the content data into one or more VOX files.

9. The method of claim 1, further comprising: receiving initiation instructions for the Web-cast via a second telephone and in response thereto, initiating the Web-cast in accordance with the Web-cast parameters.

10. The method of claim 9, wherein the receiving initiation instructions and the initiating the Web-cast occur before the receiving content data.

11. The method of claim 1, wherein the receiving information includes receiving information via a second telephone during a first call and the receiving content data occurs during a second call, the first call being different than the second call.

12. The method of claim 1, wherein the receiving instructions includes receiving instructions via a second telephone during a first call and the receiving content data occurs during a second call, the first call being different than the second call.

13. The method of claim 1, wherein the receiving content data includes receiving content data during a call and the receiving Web-cast initiation instructions includes receiving initiation instructions via a second telephone during the call.

14. The method of claim 1, wherein the initiation instructions include receiving instructions via a second telephone during a call and wherein the instructions include instructions to initiate the Web-cast after the call ends.

15. The method of claim 1, wherein the receiving content data includes receiving content data during a call and the receiving Web-cast initiation instructions includes receiving initiation instructions via a second telephone, the initiation instructions including one of the options of initiating the Web-cast during the call or initiating the Web-cast after the call ends.

16. The method of claim 15, wherein initiating the Web-cast after the call ends includes one of the options of initiating the Web-cast during another call, or initiating the Web-cast at a predetermined time.

17. The method of claim 1, further comprising initiating the serving of additional content in addition to the streaming content.

18. The method of claim 17, wherein the additional content includes a slide show presentation.

19. The method of claim 17, wherein the additional content includes a video presentation.

20. The method of claim 17, wherein the additional content is stored at a database.

21. The method of claim 17, wherein the serving of additional content is synchronized with the streaming of streaming content.

22. The method of claim 1, wherein the Web-cast parameters include at least one of a schedule identifier, a client identifier and a start time.

23. The method of claim 1, wherein the initiation instructions include at least one of an instruction to initiate the Web-cast at the time the instruction is given, and an instruction to initiate the Web-cast at a time after the time that the instruction is given.

24. The method of claim 1, wherein the encoding the content data is facilitated by a file driver program disposed at the encoder server.

25. The method of claim 1, wherein an error condition of the Web-cast is detected based on the Web-cast parameters.

26. The method of claim 25, further comprising automatically alerting a technician to the error condition.

27. A method of encoding and streaming content data to provide a Web-cast, by a client from one or more a telephones, the method comprising:
    providing information indicative of Web-cast parameters;
    providing content data from a first telephone;
    initiating broadcasting of the Web-cast's streaming content over a network in accordance with said Web-cast parameters, said initiating being one of automatic and manual as specified by an automatic-live Web-cast parameter, the streaming content being encoded content data;
    automatically monitoring a status of the Web-cast with a monitoring system; and
    automatically updating the Web-cast parameters based on the status,
    wherein said Web-cast parameters identify a scheduled start time of the Web-cast and include the automatic-live Web-cast parameter, the automatic-live Web-cast parameter is used to determine whether encoding and feeding of the content data for broadcast of the Web-cast is to be manually initiated or is to automatically commence at the scheduled start time identified by the Web-cast parameters.

28. The method of claim 27, further comprising:
    in accordance with said Web-cast parameters, initiating storing of content data; and
    wherein initiating the streaming includes retrieval of the stored content data and initiating encoding of content data into streaming content.

29. The method of claim 28, wherein the content data is provided to a telephony server and stored at a storage server, the encoding is performed by an encoder server and wherein the content data is retrieved by the encoder server from the storage server.

30. The method of claim 29, further comprising providing Web-cast initiation instructions.

31. The method of claim 30, wherein the initiation instructions are provided via a second telephone during a call and the content data is provided during the call, the Web-cast being substantially live.

32. The method of claim 30, wherein the content data is provided during a first call and the initiation instructions are provided via a second telephone during a second call, the Web-cast being time-delayed.

33. The method of claim 27, wherein initiating the streaming includes providing initiation instructions for the Web-cast via a second telephone and in response thereto, initiating the Web-cast in accordance with the Web-cast parameters.

34. A system for providing control of encoding and streaming content data to provide a Web-cast from one or more telephones, the system comprising:
    a Web server for receiving information indicative of Web-cast parameters;

a telephony sever for receiving content data from a first telephone;

an encoder server for encoding the received content data into streaming content, wherein the Web-cast parameters identify a scheduled start time for the Web-cast and include an automatic-live Web-cast parameter, the automatic-live Web-cast parameter is used to determine whether encoding and feeding of the received content data for broadcast of the Web-cast is to be manually initiated or is to automatically commence at-the scheduled start time identified by the Web-cast parameters;

a streaming server for broadcasting of the Web-cast's streaming content over a network in accordance with said Web-cast parameters, wherein said broadcasting of said streaming content is initiated either automatically or manually as specified by said automatic-live Web-cast parameter; and a monitoring system, which monitoring system automatically monitors a status of the Web-cast and automatically updates the Web-cast parameters based on the status.

35. The system of claim 34, further comprising:

a database for storing content data; and wherein the telephony server, in accordance with said Web-cast parameters, automatically issues a pull instruction, the pull instruction initiating encoding by the encoder server of content data into streaming content.

36. A method of encoding and streaming content data to provide a Web-cast, using one or more telephones, the method comprising:

receiving information indicative of Web-cast parameters;

receiving content data from a first telephone;

encoding the received content data into streaming content, wherein said Web-cast parameters identify a scheduled start time of the Web-cast and include an automatic-live Web-cast parameter, the automatic-live Web-cast parameter is used to determine whether encoding and feeding of the received content data for broadcast of the Web-cast is to be manually initiated or is to automatically commence at the scheduled start time, and content data other than the received content is initially fed at the scheduled start time specified by the Web-cast parameters in a case that the automatic-live Web-cast parameter indicates that encoding and feeding of the received content data for the broadcast of the Web-cast is to be manually initiated;

initiating broadcasting of the Web-cast's streaming content over a network in accordance with said Web-cast parameters, said initiating is either automatic or manual as specified by said automatic-live Web-cast parameter;

automatically monitoring a status of the Web-cast with a monitoring system; and automatically updating the Web-cast parameters based on the status.

37. The method of claim 36 wherein the content data other than the received content comprises an advertisement.

38. The method of claim 36 wherein the content data other than the received content comprises music.

* * * * *